Figure 1:
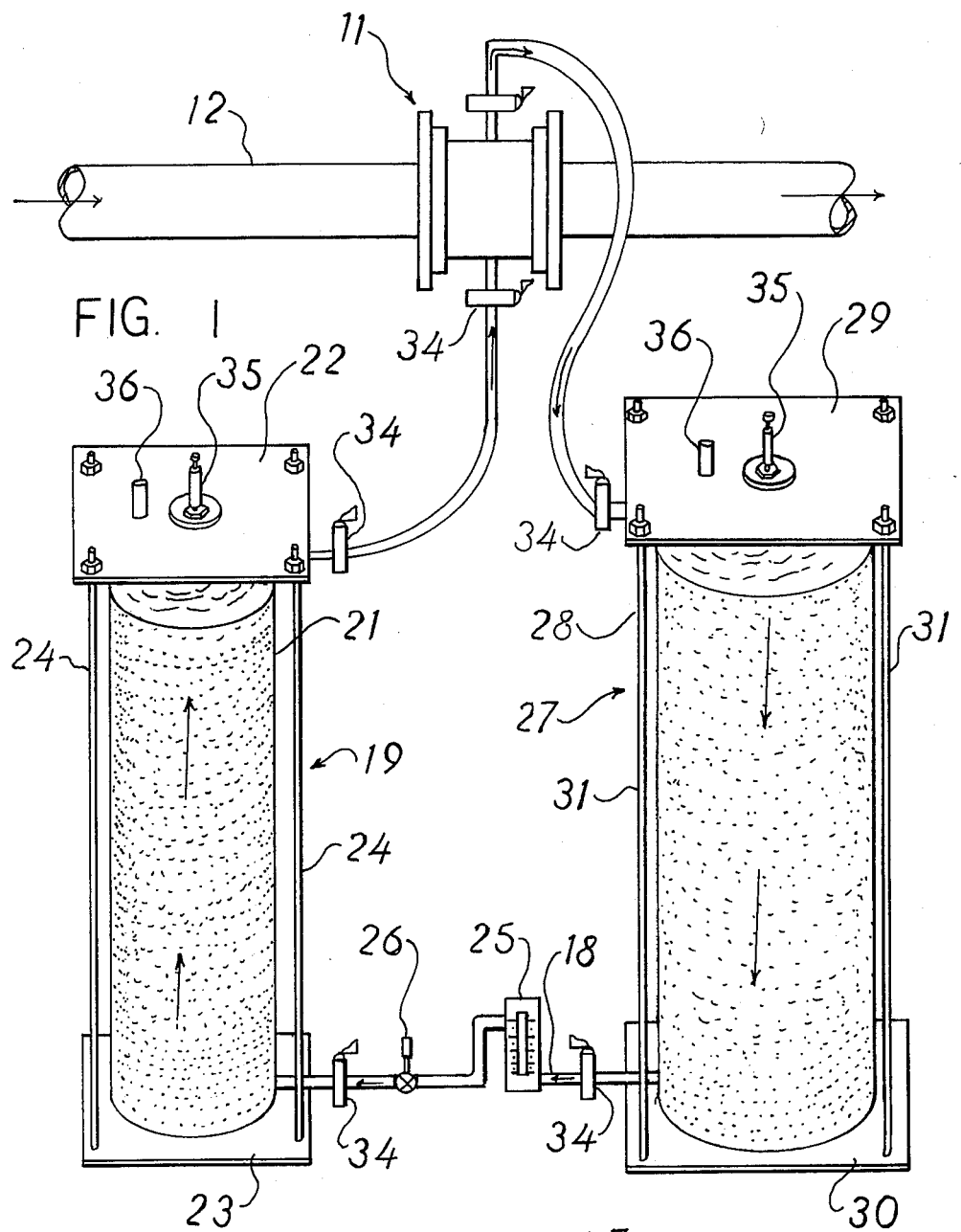

United States Patent [19]

Leo

[11] 4,234,425
[45] Nov. 18, 1980

[54] FLUORIDATION SYSTEM

[76] Inventor: John N. Leo, 9101 Hannett, NE., Albuquerque, N. Mex. 87112

[21] Appl. No.: 32,396

[22] Filed: Apr. 23, 1979

[51] Int. Cl.³ .............................................. B01J 8/04
[52] U.S. Cl. ...................................... 210/88; 210/93; 210/94; 210/753; 210/199; 210/206; 210/218; 422/190; 422/263
[58] Field of Search ............................ 210/62, 93–94, 210/198 R, 38 A, 88, 199, 206, 218; 422/263, 282, 190, 279

[56] References Cited

U.S. PATENT DOCUMENTS

| | | | |
|---|---|---|---|
| 2,112,476 | 3/1938 | Bowers et al. | 210/62 |
| 3,027,304 | 3/1962 | Robertson | 210/62 |
| 3,078,225 | 2/1963 | Maier et al. | 210/62 |
| 3,266,870 | 8/1966 | Cianflone, Jr. | 422/263 |
| 3,419,360 | 12/1968 | Rak | 422/282 |
| 3,420,637 | 1/1969 | Halff et al. | 210/62 |
| 3,595,395 | 7/1971 | Lorenzen | 422/282 |
| 4,059,522 | 11/1977 | Polley et al. | 210/62 |

*Primary Examiner*—Benoît Castel
*Attorney, Agent, or Firm*—Arthur L. Urban

[57] ABSTRACT

A fluoridation system including a venturi capable of being inserted into a water line along the length thereof, the venturi including a throughbore having a diminishing tapered section followed by an increasing tapered section in the direction of liquid flow, a passage intersecting the throughbore and extending substantially perpendicularly thereto, mechanism associated with the venturi for withdrawing water from the water line, a first conduit for transferring water from the withdrawing mechanism, a flow rate measurer in the first conduit, a flow control in the first conduit, a fluoride chamber connected to the outlet end of the first conduit, and a second conduit connecting the fluoride chamber with the passage of the venturi which is substantially perpendicular to the throughbore thereof.

5 Claims, 2 Drawing Figures

U.S. Patent    Nov. 18, 1980    4,234,425

FLUORIDATION SYSTEM

This invention relates to a novel fluoridation system and more particularly relates to a new simplified fluoridation system.

The prevention of dental caries has involved a great deal of effort on the part of a large number of people for many years. Educational programs have been used to acquaint laymen with proper dental hygiene procedures. These have involved information on the effect of various foods on tooth decay, proper tooth brushing techniques and the like. Also, laymen have been advised of the problems which can be encountered if a proper dental hygiene program is not followed.

Another area of emphasis is the achievement of widespread adoption of fluoridation programs. Such programs include those which are conducted on an individual basis such as periodic fluoride painting of the teeth by a dentist or home procedures e.g. brushing the teeth with a fluoride toothpaste or using a fluoride rinse. More preferably, is the fluoridation of the water supply. This latter type of fluoridation provides the required treatment automatically without any conscience action on the part of the participants.

While the fluoridation of a water supply has been proven to be safe and effective in reducing the incidence of tooth decay, most fluoridation systems presently in use are complex in nature and require a significant degree of surveillance and maintenance. Thus, present systems are better adapted for use in the water treatment systems of large metropolitan areas where the larger tax base and the size of the water treatment facilities justify the employment of trained engineers and technicians. Such trained personnel not only monitors the water treatment but also is available to monitor the fluoridation system. Since more than 60% of the communities that fluoridate their water supplies have populations under 5000 according to HEW statistics, it is apparent that the achieving of adequate surveillance and maintenance is a significant problem. One survey of more than 100 fluoridated water systems showed that nearly half did not contain an adequate amount of fluoride. Another survey of more than 80 fluoridated water systems found that about two-thirds were either not operating or were operating incorrectly and less than one-third had operated continuously for the previous twelve months.

A variety of factors are cited for the failures of the fluoridation systems to function properly. Failure of the pump used to add the fluoride, inability to obtain repair parts and feeder solution promptly when required, plugging and encrustation of components and similar problems are given as reasons for the failures.

Other factors which limit adaption of fluoridation systems presently available include the high cost of the systems, proximity to electricity or other power sources, inability to hire trained supervisory personnel and the like.

The present invention provides a novel fluoridation system that does not require a power source. The novel fluoridation system of the invention provides a simple and convenient means for fluoridating a water supply on a continuous basis. The fluoridation system is suitable not only for large metropolitan areas but also for small communities and even individual homes. The system of the invention requires a minimum of surveillance and maintenance. In addition, the supervision of the fluoridation system can be accomplished successfully by semi-skilled personnel after a minimum of instruction.

The fluoridation system of the invention is simple in design and relatively inexpensive. Further, the system can be fabricated from commercially available materials and components. Also, the fluoridation system can be installed easily and relatively quickly. Another important advantage of the system is that no accidental injection of concentrated fluoride into the water supply is possible. Thus, the fluoridation system provides a fail safe control of the fluoridation.

Figure 2:
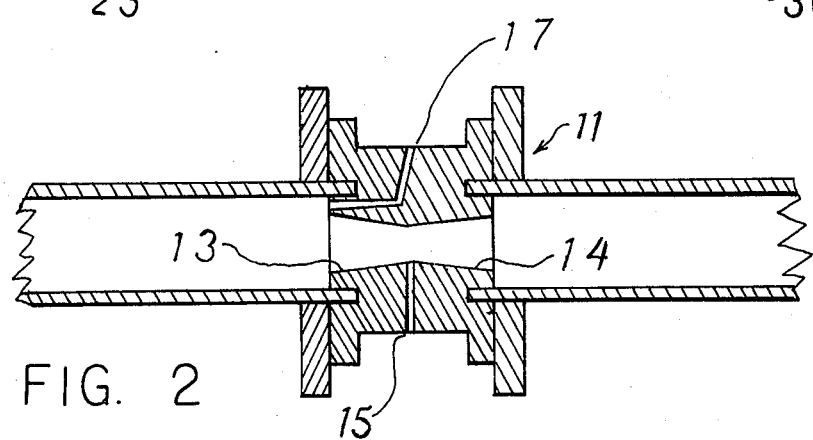

Other benefits and advantages of the novel fluoridation system of the invention will be apparent from the following description and the accompanying drawings in which:

FIG. 1 is a schematic illustration partially in perspective of one form of the novel fluoridation system of the invention; and FIG. 2 is an enlarged side view in section of the venturi portion of the fluoridation system shown in FIG. 1.

As shown in the drawings, one form of the novel fluoridation system of the present invention includes a venturi 11 inserted into a water line 12 carrying water from a supply source such as a reservoir (not shown). The water line 12 may be part of a community water distribution system or may be included in a water distribution system for one or a few buildings.

The venturi 11 includes a throughbore with a diminishing tapered section 13 followed by an increasing tapered section 14 in the direction of liquid flow. The venturi 11 also includes a passage 15 which intersects the throughbore adjacent its constriction point and extends substantially perpendicularly thereto.

Associated with the venturi 11 is means for withdrawing water from the water line 12. Advantageously, the withdrawing means is a passage 17 in the venturi 11. Preferably, as shown, the passage 17 is located along one side of the throughbore of the venturi.

A first conduit means transfers water from passage 17 to a fluoride chamber. Advantageously, the first conduit means includes water softening means which will be described hereinafter. As shown, a first conduit means 18 transfers water from passage 17 of venturi 11 through a water softening chamber 27 to a chamber 19 containing a soluble fluoride. First conduit 18 also includes flow rate measuring means shown as flowmeter 25 and flow control means shown as metering valve 26.

Fluoride chamber 19 may be any suitable container and advantageously as shown may be formed with a main section 21, preferably transparent, with end plates 22 and 23. End plates 22 and 23 are held tightly against the ends of main section 21 with tie rods 24. If desired, the tie rods may have threaded ends capable of receiving suitable nuts and washers. To provide water tight seals between the ends of the main section and the end plates 22 and 23, gaskets (not shown) advantageously are positioned therebetween.

The water softening chamber 27 may be a suitable container and preferably may be similar to the fluoride chamber 19. Chamber 27 may include a main section 28 with end plates 29 and 30 and tie rods 31.

A second conduit means 33 connects the fluoride chamber 19 with passage 15 of the venturi 11. The second conduit 33 advantageously is connected to the fluoride chamber 19 adjacent the end of the chamber opposite to that to which the first conduit 18 is connected. Preferably, the first conduit 18 is connected adjacent to the bottom of the chamber 19 and the second conduit 33 is connected adjacent to the top of the fluoride chamber. The conduits 18 and 33 include a plurality of valves 34 along their lengths to allow the shutting off of water or fluoride solution through the system when desired. This arrangement can facilitate the addition of materials to the chambers 19 and 27 and/or the cleaning or maintenance thereof.

Fluoride chamber 19 and water softening chamber 27 also advantageously include venting means. As shown, chambers 19 and 27 include venting devices 35 which preferably operate automatically to vent any accumulation of air from the chambers. To prevent any possibility of accidental siphoning of fluoride, a snifter vent 36 may be incorporated with each chamber.

The fluoride chamber 19 advantageously contains a water soluble fluoride salt such as sodium fluoride. The chamber 27 preferably contains a commercial water softening material such as a Zeolite softener. The water softener is desirable to minimize the possibility of encrustation or plugging at passage 15 where the fluoride solution is injected into the water line 12. If the water supply is a soft water or already softened, the water softener may be eliminated. In this situation, the water from passage 17 would pass directly through conduit 18 to the fluoride chamber 19.

In the operation of the novel fluoridation system of the present invention as shown in the drawings, a portion of the water passing through line 12 enters passage 17 in venturi 11 while the major portion passes through the throughbore thereof. The water entering passage 17 moves along the first conduit 18 into water softening chamber 27 where a substantial part of the hardness is removed.

Then, the softened water moves along the next section of conduit 18 and through flowmeter 25 which measures the rate at which the water is moving through the system. A desired flow rate is provided by adjusting metering valve 26 located in the conduit 18. The water from conduit 18 enters the fluoride chamber 19 and passes therethrough picking up a portion of the soluble fluoride salts in the chamber to form a fluoride solution.

The fluoride solution exiting from chamber 19 passes along conduit 33 and into passage 15 of the venturi 11, which passage is oriented substantially perpendicularly to the throughbore of the venturi. Since passage 15 is located at the restriction point between diminishing section 13 and increasing section 14, the fluoride solution from conduit 33 mixes with the main flow of water through line 12 to provide a substantially uniform dilute concentration of fluoride in the water. This fluoride treated water then is distributed to the outlets of the water distribution system for use by individuals in the buildings connected to the water distribution system. In this way, individuals and particularly children can simply and conveniently receive the concentration of fluoride required to provide a significant reduction in dental caries.

The above description and the accompanying drawings show that the present invention provides a novel fluoridation system with advantages and benefits not achievable with systems presently available. The fluoridation system of the invention is suitable for use both in large water treatment plants of metropolitan areas and also more importantly for small communities and even single or only a few buildings. The system of the invention provides a simple solution to the problems often encountered by small water users with previous systems.

The fluoridation system of the invention is simple in design and relatively inexpensive. The system requires a minimum of monitoring and maintenance. Also, the system of the invention minimizes the handling of chemicals and does not need any outside source of power to drive a pump since no pump is employeed. Furthermore, there is no danger of concentrated fluoride entering the water supply. Thus, the fluoridation system of the invention is particularly suitable in rural or even primitive low volume water distribution systems which cannot practically use conventional water fluoridation systems. The fluoridation system of the invention provides an opportunity for low cost safe fluoridation for individuals for whom it previously was not available.

It will be apparent that various modifications can be made in the particular fluoridation system described in detail above and shown in the drawings within the scope of the invention. For example, the size and configuration of specific components of the system can be changed to meet particular requirements. Also, the arrangement of the various components of the system can be varied for installations with limited space. In addition, the materials of construction can be selected to be compatible with the chemicals used in the system. Therefore, the scope of the invention is to be limited only by the following claims.

What is claimed is:

1. A fluoridation system including a venturi inserted into a water line along the length thereof, said venturi including a throughbore having a diminishing tapered section followed by an increasing tapered section in the direction of liquid flow, a passage intersecting said throughbore and extending substantially perpendicularly thereto, means associated with said venturi for withdrawing water from said water line, a first conduit means including an inlet end for transferring water from said withdrawing means to and through a chamber containing a water softening material for softening the water passing through said first conduit means, flow rate measuring means in said first conduit means, flow control means in said first conduit means, said first conduit means including an outlet end connected to a fluoride chamber containing a water-soluble fluoride salt, said outlet end of said first conduit means being connected adjacent the bottom of said fluoride chamber, a second conduit means connected adjacent the top of said fluoride chamber, said second conduit means connecting said fluoride chamber with said passage of said venturi which is substantially perpendicular to said throughbore thereof, flow control means in said second conduit means, said fluoride chamber including a transparent portion for inspection of the contents thereof.

2. A fluoridation system according to claim 1 wherein said means for withdrawing water from said water line is a passage in said venturi.

3. A fluoridation system according to claim 2 wherein said passage in said venturi is located along one side of said throughbore of said venturi.

4. A fluoridation system according to claim 1 including vent means for removing air in said fluoride chamber.

5. A fluoridation system according to claim 1 including vent means for preventing a vacuum in said fluoride chamber.

* * * * *